United States Patent [19]

DeShano

[11] 4,221,529
[45] Sep. 9, 1980

[54] DELIVERY TRAILER

[76] Inventor: Al DeShano, 3693 Scott Ave., Shandon, Ohio 45063

[21] Appl. No.: 901,112

[22] Filed: Apr. 28, 1978

[51] Int. Cl.$^2$ ............................................. B60P 1/20
[52] U.S. Cl. ...................................... 414/546; 296/3; 414/648
[58] Field of Search ............... 414/540, 541, 545, 546, 414/549, 556, 539, 648, 649, 639; 296/3, 4, 5

[56] References Cited

U.S. PATENT DOCUMENTS

| | | | |
|---|---|---|---|
| 983,774 | 2/1911 | Schuman | 414/549 |
| 2,857,066 | 10/1958 | West | 414/648 |
| 3,786,947 | 1/1974 | Craft | 296/3 |

FOREIGN PATENT DOCUMENTS 917325  2/1963  United Kingdom ........................ 296/3

*Primary Examiner*—Stephen G. Kunin
*Assistant Examiner*—Edmond G. Rishell, Jr.

*Attorney, Agent, or Firm*—Thomas E. Beall, Jr.

[57] ABSTRACT

Individual shelves are provided on the load transport vehicle, which may be a trailor or self-propelled steerable vehicle, so that the shelves may be dropped down adjacent to the roadway for loading and unloading, and lifted up above the clearance height of the vehicle for storage and transport. Guides and bearings are provided between the shelf and body of the vehicle so that the horizontal portion of the shelves will be parallel to the roadway in their lower loading and unloading position to facilitate such loading and unloading, and they will tilt during their travel between such positions so that in the storage position the generally horizontal portion of the shelf will extend downwardly and inwardly to maintain the load on the vehicle with the help of gravity. The frame of the vehicle is provided with a central vertical and longitudinal rib carrying the guides for supporting shelves on each side. The shelves are L-shaped, and are provided with hydraulic cylinders for individually raising and lowering.

13 Claims, 5 Drawing Figures

DELIVERY TRAILER

BACKGROUND OF THE INVENTION

The present invention relates to vehicles, either trailor or self-propelled vehicles, which are used for transporting loads, such a palletized loads.

Vehicles of this kind are well known, and many of them include racks or shelves that are moveable vertically to facilitate loading and unloading. Further, it is well known to provide such shelves with a tilt to their generally horizontal load supporting surface, which tilt is downward and inward with respect to the vehicle so as to maintain the load on the vehicle by gravity.

It is a known objective in the construction and design of such vehicles to produce an economical design that will function reliably, safely, and easily.

SUMMARY OF THE INVENTION

It is an object of the present invention to provide a vehicle for transporting and storing loads, particularly palletized loads, which vehicle is economical to manufacture and maintain, is simple in its construction and repair, is reliable and safe in its operation, and which is easy to use.

These objects are achieved to a great extent by providing a vehicle, either a trailor or self propelled vehicle, with a central longitudinal and vertical rib that provides the main beam strength of the vehicle as well as the support from which the shelves are hung. These shelves are constructed with an L-shape so that guides and bearings may be installed between the generally vertical leg of the L-shape and the central rib to support and provide movement for the shelf between a lowermost loading and unloading position wherein its generally horizontal portion is resting on or closely adjacent to the roadway, and an upper or storage position above the clearance height of the vehicle for travel and storage. In the uppermost position, the guides and bearings support the horizontal portion of the shelf so that it tilts downwardly and inwardly to reliably hold the load on the vehicle by gravity, and further, they tilt the shelf so that it is horizontal and parallel to the roadway in its lowermost loading and unloading position.

Power for moving the shelves between their positions is provided by a mechanical mechanism, preferably a hydraulic cylinder, between each of the shelves and the chassis or frame of the vehicle. The controls for the cylinders are provided immediately adjacent to the shelves that they power, for ease in handling. Each of the cylinders operates independently, for corresponding independent movement of the shelves.

Figure 1:
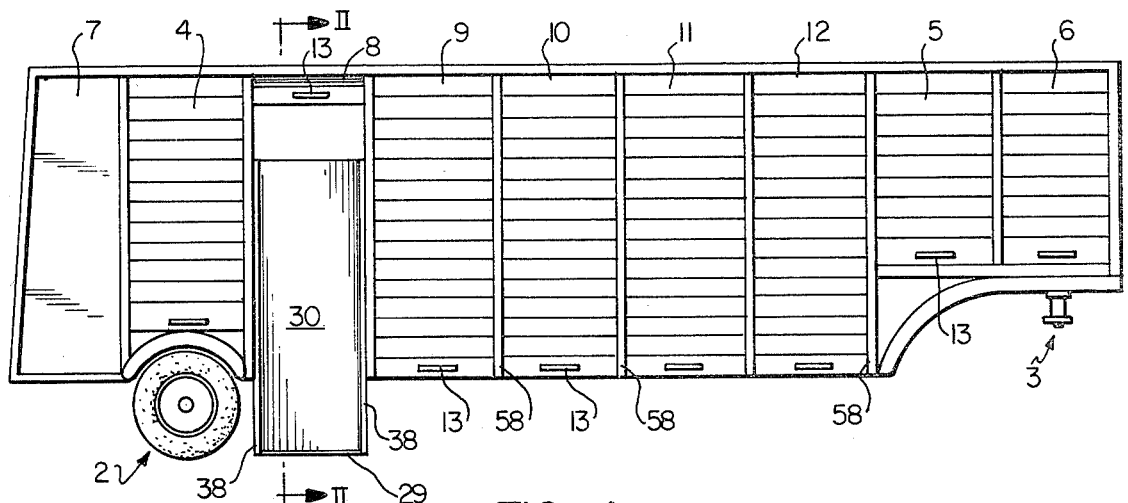
FIG. 1 is a side elevational view of a preferred embodiment of a vehicle illustrating the features of the present invention.
Figure 3:
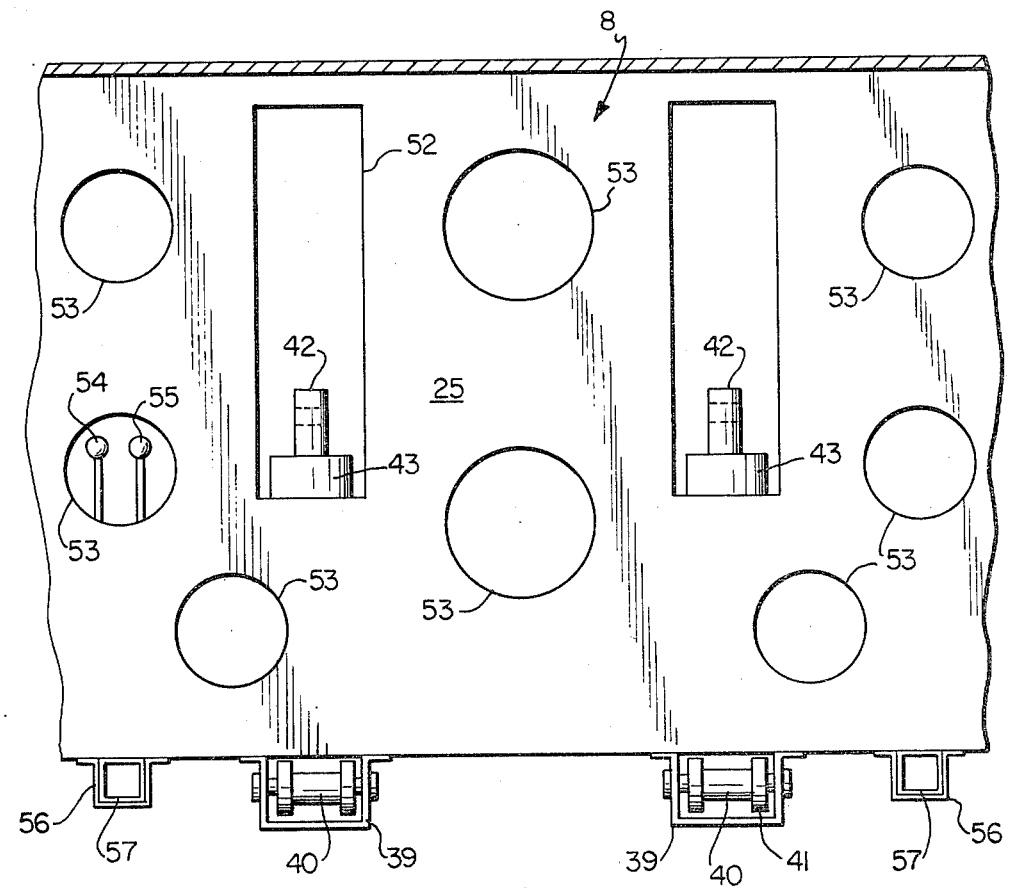
FIG. 3 is a partial view taken along line III—III of FIG. 2.

The features of the present invention may be used with a self-propelled vehicle, that is a vehicle having a driver's cab, engine, transmission, drive train and steerable wheels, or it may be used in a trailer. For purposes of illustration, a preferred embodiment is illustrated in the drawings as a trailer shown in FIG. 1. The trailer has a conventional set of rigid axle rear wheels 2, and a "fifth wheel" 3 for securement to the towing cab. This trailer is provided with a plurality of compartments 4, 5, 6 and 7 that are conventional in construction and provide storage areas. The compartments may be open as shown at 7, or provided with flexible sliding doors as shown for compartments 4-6. Additional compartments 8, 9, 10, 11 and 12 are constructed according to the present invention to provide self-loading and unloading shelves, which will be described in more detail.

In FIG. 1, flexible sliding doors have been shown to normally close the compartments 4, 5, 6, 8, 9, 10, 11 and 12. These doors slide vertically on tracks from a closed position, for example with respect compartment 9, upwardly to an open position as shown for example with compartment 8. The sliding doors are moved by grasping handles 13 and moving them between their positions. In the position shown for compartment 8, the door is rolled up, in a conventional manner, in a storage position (not shown). The present invention may be practiced equally well by providing open compartments, that is compartments without any doors. For this reason, the doors are not shown in any of the other figures, and further the FIGS. 2-5 illustrate only the construction of the shelves and compartments 8-12.

Figure 2:
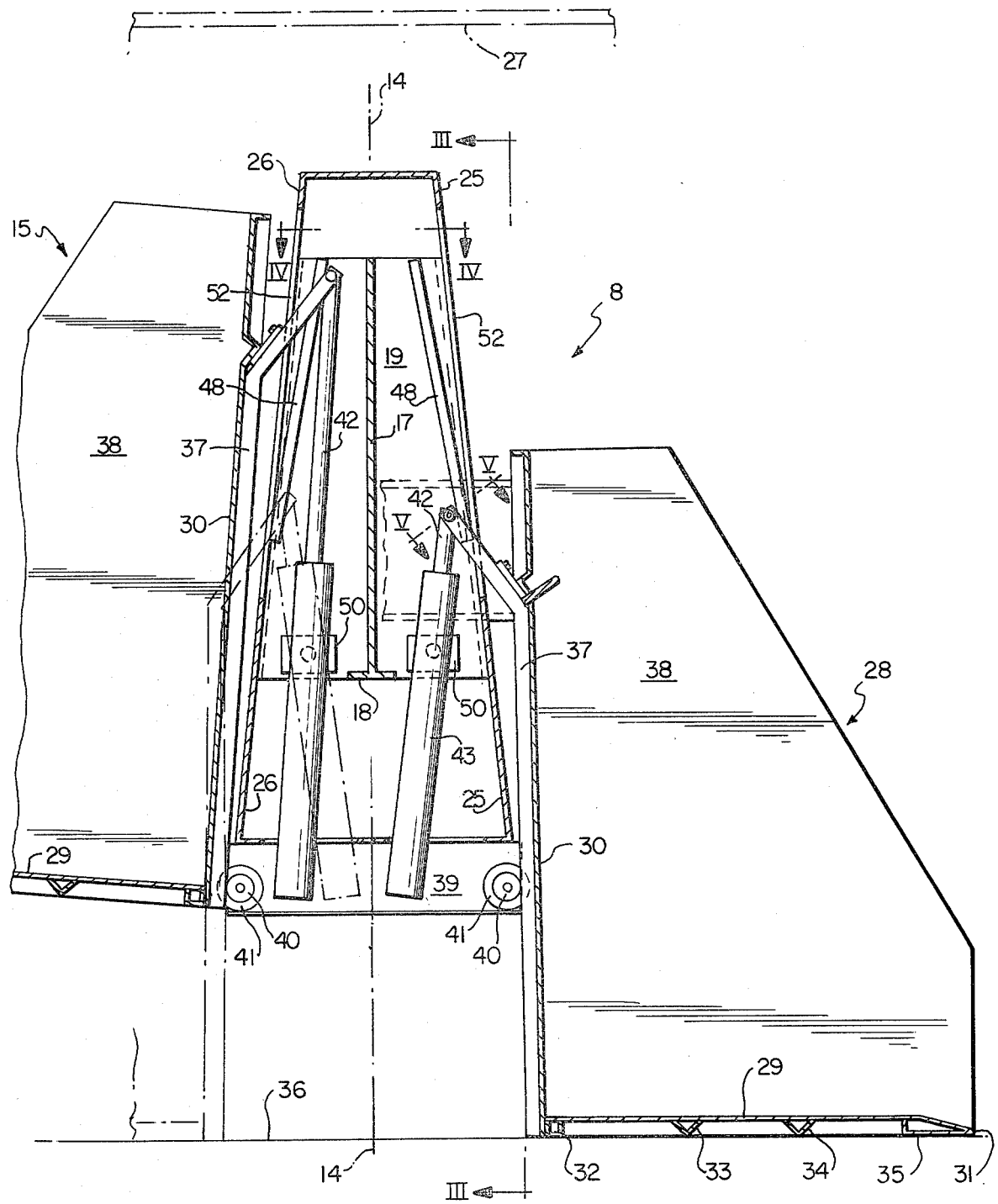
FIG. 2 is a partial cross-sectional view taken along line II—II of FIG. 1.

As shown in FIG. 2, the vehicle has a central, vertical, longitudinal (with respect to the driving direction) plane of symmetry 14. In FIG. 2, the construction shown to the right of the plane of symmetry is the mirror image of the structure shown to the left of the plane of symmetry, with the shelf to the right being in the lowermost loading position, while the shelf to the left is in the uppermost storage and transport position. Since compartments 8-12 are identical in construction, and since it is to be understood that corresponding compartments are provided on the opposite side of the vehicle, only the construction of compartment 8 will be described in detail, with some of the structure of the compartment 15 on the opposite side of the vehicle from the compartment 8 being shown in FIGS. 2 and 4.

Figure 4:
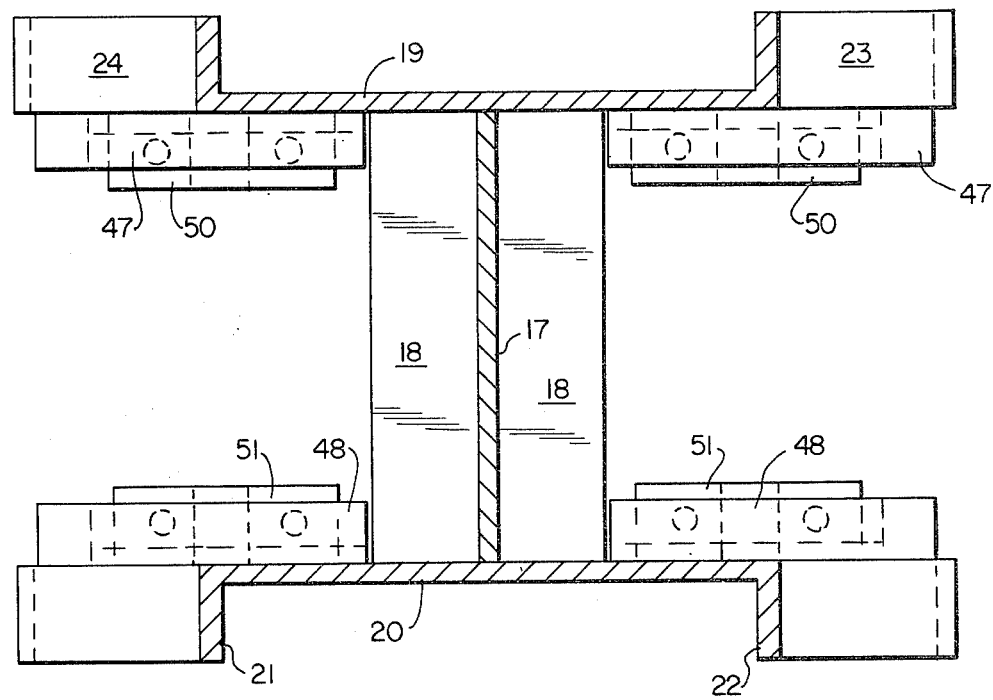
FIG. 4 is a cross-sectional view of one element in FIG. 2, as seen from line IV—IV.

For the compartments 8 and 15, two columns or braces as shown in FIG. 4 are provided. The brace is constructed of sheet steel that is cut, bent and welded. The brace has a central plate 17 that lies in the plane of symmetry 14, a horizontal foot plate 18, and opposed mirror image side plates 19, 20. The plates 17, 18 are rectangular. The plates 19 and 20 are frusto-triangular in shape, as seen in FIG. 2, with bent side flanges 21, 22, 23, 24. The side flanges 22, 23 are coplanar, while the side flanges 21, 24 are coplaner. For the length of the trailer that includes compartments 8, 9, 10, 11 and 12, there are thus provided ten braces as shown in FIG. 4, which are longitudinally aligned. A sheet of steel forming a side plate 25 (shown in FIG. 3 and FIG. 2) preferably extends for the full heighth of and is connected to each of the side flanges 22, 23, and further extends for the full length of the compartments 8, 9, 10, 11 and 12. A similar sheet of steel forming a side plate 26 (as shown in FIG. 2) is welded to the side flanges 21, 24 of the braces. Of course, the side plates 25, 26 may be fabricated from a plurality of steel sheets welded to each other. In this manner, a box-beam or rib is constructed for at least the full length of the vehicle including compartments 8-12. This beam, in a modified form, would continue over the length of the compartments 4, 5, 6 and 7 to form the main structural strength of the trailer. Some type of roof 27 covers the trailer, and may be of any conventional construction that is secured to the upper portion of the box-beam.

Each of the compartments 8, 9, 10, 11 and 12, and their corresponding mirror image compartments, for example 15, are provided with a single shelf 28. Each shelf 28 is constructed of a basic L-shape, with a generally horizontal load supporting surface 29 and a generally vertical leg 30. The load supporting surface 29 is constructed of a flat sheet metal plate extending over the entire plan area of the shelf from a load edge 31 to the leg 30, with a plurality of cross braces 32, 33, 34, 35. The loading edge is tapered, so that in its loading position, shown to the right of FIG. 2, it will extend down to the ground level or roadway 36. The leg 30 is constructed of a back sheet metal plate extending over the entire back of the shelf and at least two column members 37, that may be rectangular cross-sectional shaped tubular steel welded to the back plate. Each of the shelves is further provided with two side plates 38, with each side plate being welded to the entire adjacent side edges of the back plate for the leg 30, the bottom plate for the generally horizontal portion 29, and the cross braces 32–35.

Each one of the shelves is supported on the box-beam for movement between a lowermost loading position shown to the right in FIG. 2 and an uppermost transport and storage position shown to the left in FIG. 2. Beneath the box beam, there is provided two cross channels 39 for each pair of compartments, for example compartments 8, 15. At the outer ends of each channel 39, a roller 40 having side flanges 41 is rotatably mounted about a horizontal longitudinally aligned axis. All of the rollers 40 on one side of the plane of symmetry 14 are coaxial, while all of the rollers 40 on the opposite side of the plane 14 are coaxial. For each shelf, each one of the two column members 37 engages a corresponding roller 40 between the side flanges 41.

Figure 5:
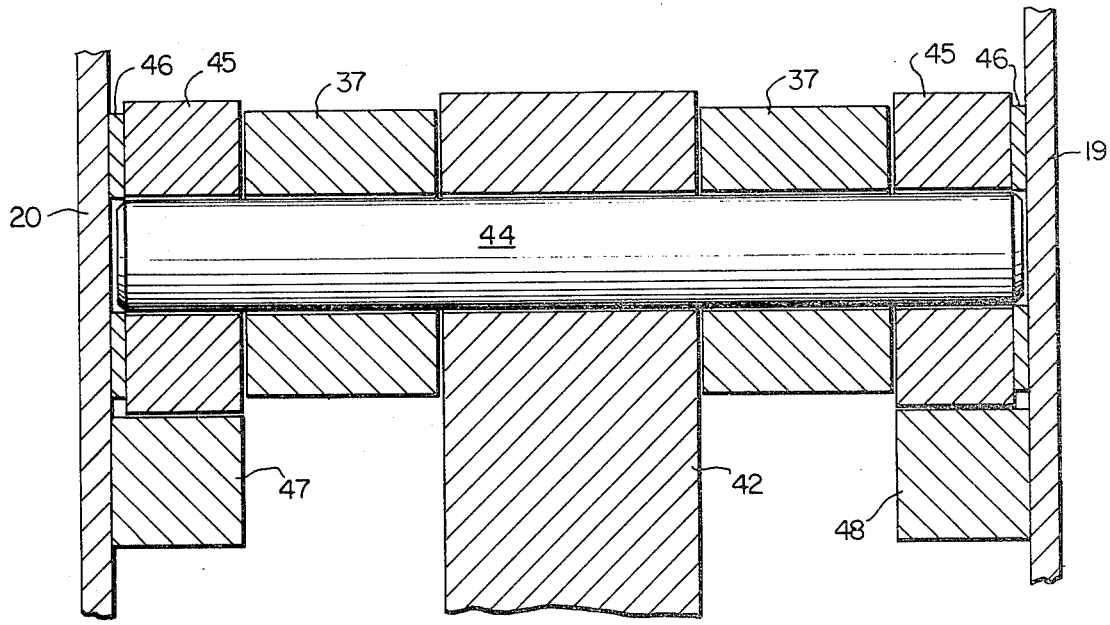
FIG. 5 is a partial cross-sectional view taken along line V—V of FIG. 2.

The upper end of each column member 37 extends inwardly and away from the leg 30 of its shelf to be secured at its outermost end to the piston rod 42 of a hydraulic ram 43. With particular reference to FIG. 5, it is seen that the column member 37 is split at its upper end to receive therebetween the upper end of the rod 42, with each being provided with cross bores for the reception of a pivot pin 44. A roller 45 is supported on each outer end of the pivot pin 44, with thrust washers 46 between the rollers 45 and the side plates 19, 20. To control the movement of this pivotal connection between the ram 43 and shelf, cam tracks 47, 48 are respectively welded to the side plates 19, 20 at an angle, for example 14 with respect to the vertical. The rollers 45 respectively engage the tracks 47, 48.

Each of the hydraulic rams 43 has its cylinder pivotally mounted. Stub shafts extend outwardly from opposite sides of each cylinder to be engaged within bearing blocks 50, 51 respectively secured to the side plates 19, 20.

Each of the box-beam side plates 25, 26 is provided with a vertically extending rectangular opening 52 for each of the rams 43, so that the inwardly bent portion of the column members 37 may extend therethrough. A plurality of additional holes 53, which may be of any shape, are provided through out the plates 25 & 26 to provide access to the interior of the box-beam, to reduce the weight of the vehicle, to provide maintenance and installation access to the interior of the box-beam for hydraulic lines and mounting of the rams 43, and to provide operating access to various controls. For example, controls 54, 55 are provided and accessible from one side of the vehicle. The control 55 may be a hand lever used to operate a valve that provides common control for the two hydraulic rams 43 for compartment 8 immediately to the right of the handle 55, while the control 54 may be used to provide control of the corresponding hydraulic rams shown to the left in FIG. 2 for compartment 15 that is opposite to the compartment 8. Since the control valves, hydraulic fluid sump, pump and interconnecting hydraulic lines are well known per se, they have not been shown in detail.

Between each compartment and below the box-beam, there is provided a cross-channel 56 welded to the box-beam. A tubular beam 57 extends within the cross channel 56, and is perferably welded thereto so that it extends in a cantilevered fashion outwardly from each side of the cross beam to support at each outer end: the lower end of compartment dividing partitions 58, and, if desired, hand control levers connected by rods (not shown) to the controls 54, 55. These dividing partitions 58 may contain therein the tracks (not shown) for slidability mounting the doors of the compartments.

OPERATION

When it is desired to load the vehicle, the controls 54, 55 are operated to remove hydraulic fluid from the cylinders 43, which may be single acting or double acting, so as to withdraw the piston rod 42 and correspondingly lower the shelf 28. Due to the inclination of the tracks 47, 48, the horizontal load supporting portion of the shelf will be horizontal, that is parallel to the roadway 36, in the lowermost loading position shown to the right in FIG. 2. In this position, goods may be loaded onto the shelf, for example loaded pallets may be loaded onto the shelf with a fork-lift truck, or wheeled carts may be pushed directly onto the shelf. Thereafter, the controls are operated to expand the hydraulic rams 43 to thereby move the piston rod 42 upwardly and move the shelf 28 upwardly. As the shelf 28 moves upwardly, the cam tracks 47, 48 will tilt the shelf so that its horizontal load supporting surface will be inclined downwardly and inwardly with respect to the central vertical plane 14 at approximately 5° so that the goods on the shelf will be held on the shelves by gravity against the back leg 30, while the side plates 38 of the shelf provide for support in the longitudinal direction during acceleration and braking of the vehicle. When provided, the sliding doors will be opened during loading and unloading, and will be closed during transport.

As variations of the illustrated embodiment, the side plates 38 may be eliminated or replaced with tension rods, load edge 31 may be hinged to a brace, the roof doors and partitions may be eliminated and tension rods at an angle may support cantilevered beams 57 from the top of the beam. Most preferably the box beam provides the only beam strength of the entire vehicle between the wheels 2 and "fifth wheel" 3. The shelf 28 and side walls could be replaced by forks to engage pallets delivered by a fork lift truck. Also, the side walls and shelf 28 could be eliminated completely so that a load carried by a mobile cart or the like could be engaged by the hook shown in FIG. 2 welded to each column 37 at the point where the column is bent. Such hook could be in turn replaced by clamps to grasp a container, wheeled or not.

While a preferred embodiment of the present invention has been illustrated in detail as the best mode for practicing the invention to illustrate the broader concepts of the present invention as well as desirable specific details, further embodiments, variations and modifications are contemplated all within the spirit and scope of the present invention as defined by the following claims.

I claim:

1. A vehicle for transporting loads, comprising:
a rigid chassis;
a plurality of wheels mounted on said chassis to support said chassis above a roadway at a clearance height for rolling movement in a travel direction;
said chassis being elongated in the travel direction and having a central rigid rib running through a major portion of its length;
a plurality of roller guides secured to each side of said rib;
a plurality of load supports, each load support having two parallel columns respectively engaging said roller guides so that each load support is mounted for movement from a lower loading-unloading position immediately adjacent to the roadway to an upper storage position above the clearance height of said chassis;
a power mechanism for each of said load supports operatively mounted between said chassis and its load support for selectively driving said load support between its said upper and lower positions, each power mechanism comprising two parallel fluid rams each having a piston member and a cylinder member with one member pivotally connected directly to said rib and the other member pivotally connected about an axis directly to a respective one of said columns; and
a roller rotatably mounted about the pivotal connection of each column to its respective member, and a cam track fixedly mounted on said rib for engaging said roller during expansion and contraction of said fluid ram to control the positioning of the respective load support.

2. The vehicle of claim 1, wherein each of said load supports is a shelf having, when viewed in a vertical plane generally perpendicular to the travel direction, an L-shape with a generally vertical leg including said column, and a generally horizontal leg for supporting the load.

3. The vehicle of claim 2, wherein said rollers and roller guides hold said generally horizontal leg in a downwardly and inwardly tilted storage position so as to maintain the load carried by each shelf on the vehicle by gravity bias toward said rib, and maintaining said generally horizontal leg substantially perpendicular to a central vertical plane extending in the travel direction in the load support's loading-unloading position.

4. A vehicle for transporting loads, comprising:
a rigid chassis;
a plurality of wheels mounted on said chassis to support said chassis above a roadway at a clearance height for rolling movement in a travel direction;
said chassis being elongated in the travel direction and having a central rigid rib running through a major portion of its length;
a plurality of guides secured to each side of said rib;
a plurality of load supports having bearing means engaging said guides so that each load support is mounted for movement from a lower loading-unloading position immediately adjacent to the roadway to an upper storage position above the clearance height of said chassis;
a power mechanism for each of said load supports operatively mounted between said chassis and its load support for selectively driving said load support between its said upper and lower positions;
said chassis rib, on each side, having a downwardly and outwardly extending sheet metal face for a major portion of the length of said chassis in the travel direction and height of said chassis forming a box-beam constructing;
vertically extending apertures through said face passing therethrough a drive portion of each of said load supports;
a plurality of braces extending between said sheet metal faces;
and said power mechanism being entirely within said box-beam construction and drivingly connected to said drive portions.

5. The vehicle of claim 4, wherein each of said load supports has a first portion carrying said bearing means and said drive portion extending upwardly and inwardly at a substantial angle from said first portion, so that said first portion lies completely outside of said sheet metal face and the upper end of said drive portion lies completely inside of said sheet metal face; and said power mechanism being secured to the upper end of said drive portion.

6. The vehicle of claim 4, wherein said box beam construction provides the sole longitudinal beam strength of the rigid chassis.

7. The vehicle of claim 6, wherein said power mechanism is at least one fluid piston-cylinder operatively connected between a first horizonal pivot axis secured to and within said box beam construction, and a second horizontal pivot axis above said first pivot axis and secured to said drive portion within said box beam construction; said guides comprising a track rigidly secured to and within said box beam construction, a support roller engaging said track and rotatably mounted on the upper pivot axis, and a guide roller freely rotatably mounted on said box beam construction to have a peripheral portion extending outwardly from the lowermost portion of said box beam construction in engagement with the bearing means on said load support; said load support bearing means being a vertically extending column member, extending for a major height of said load support; the upper end of said column member being bent inwardly to constitute said drive portion and being pivotally connected at its outermost end to said upper axis.

8. The vehicle of claim 1, wherein said rollers and roller guides tilt said load support inwardly and downwardly as it moves from said loading-unloading position to said storage position, so that loads may be easily placed on said load support in said loading-unloading position, and tilted with said load support so as to be biased downwardly and inwardly by gravity in said storage position to securely hold the load on the vehicle.

9. A load transport vehicle, comprising:
a rigid chassis;
a plurality of wheels mounted on said chassis to support said chassis above a roadway at a clearance height for rolling movement in a travel direction;

said chassis being elongated in the travel direction and having a central rigid rib running through a major portion of its length;

a plurality of guides secured to each side of said rib;

a plurality of load supports having bearing means engaging said guides so that each load support is mounted for movement from a lower loading-unloading position immediately adjacent to the roadway to an upper storage position above the clearance height of said chassis;

a power mechanism for each of said load supports operatively mounted between said chassis and its load support for selectively driving said load support between its said upper and lower positions;

said guides and bearing means tilt said load support inwardly and downwardly as it moves from said loading-unloading position to said storage position, so that loads may be easily placed on said load support in said loading-inloading position, and tilted with said load support so as to be biased downwardly and inwardly by gravity in said storage position to securely hold the load on the vehicle;

said chassis rib, on each side, has a downwardly and outwardly extending sheet metal face with a major portion of the length of said chassis in the travel direction and height of said chassis forming a box-beam construction; vertically extending apertures through said face passing therethrough a drive portion of each of said load supports; a plurality of braces extending between said sheet metal faces; and said power mechanism being entirely with said box beam construction and drivingly connected to said drive portions.

10. The vehicle of claim 9, wherein said power mechanism is at least one fluid piston-cylinder operatively connected between a first horizontal pivot axis secured to and within said box beam construction, and a second horizontal pivot axis above said first pivot axis and secured to said drive portion within said box beam construction; said guides comprising a track rigidly secured to and within said box beam construction, a support roller engaging said track and rotatably mounted on the upper pivot axis, and a guide roller freely rotatably mounted on said box beam construction to have a peripheral portion extending outwardly from the lowermost portion of said box beam construction in engagement with the bearing means on said load support; said load support bearing means being a vertically extending column member, extending for a major height of said load support; the upper end of said column member being bent inwardly to constitute said drive portion and being pivotally connected at its outermost end to said upper axis.

11. The vehicle of claim 1, wherein said load support includes a hook for securing a load to said load support.

12. The vehicle of claim 1, wherein said load support includes at least one load engaging member being horizontal in said loading-unloading position and extending cantilevered outwardly from said columns.

13. The vehicle of claim 1, wherein said central rigid rib lies completely to the inside of each of said load supports and constitutes the sole longitudinal beam strength of said chassis.

* * * * *